Dec. 8, 1942.   R. G. KITE   2,304,695
PEANUT VINE STACKING STAKE
Filed Sept. 27, 1941
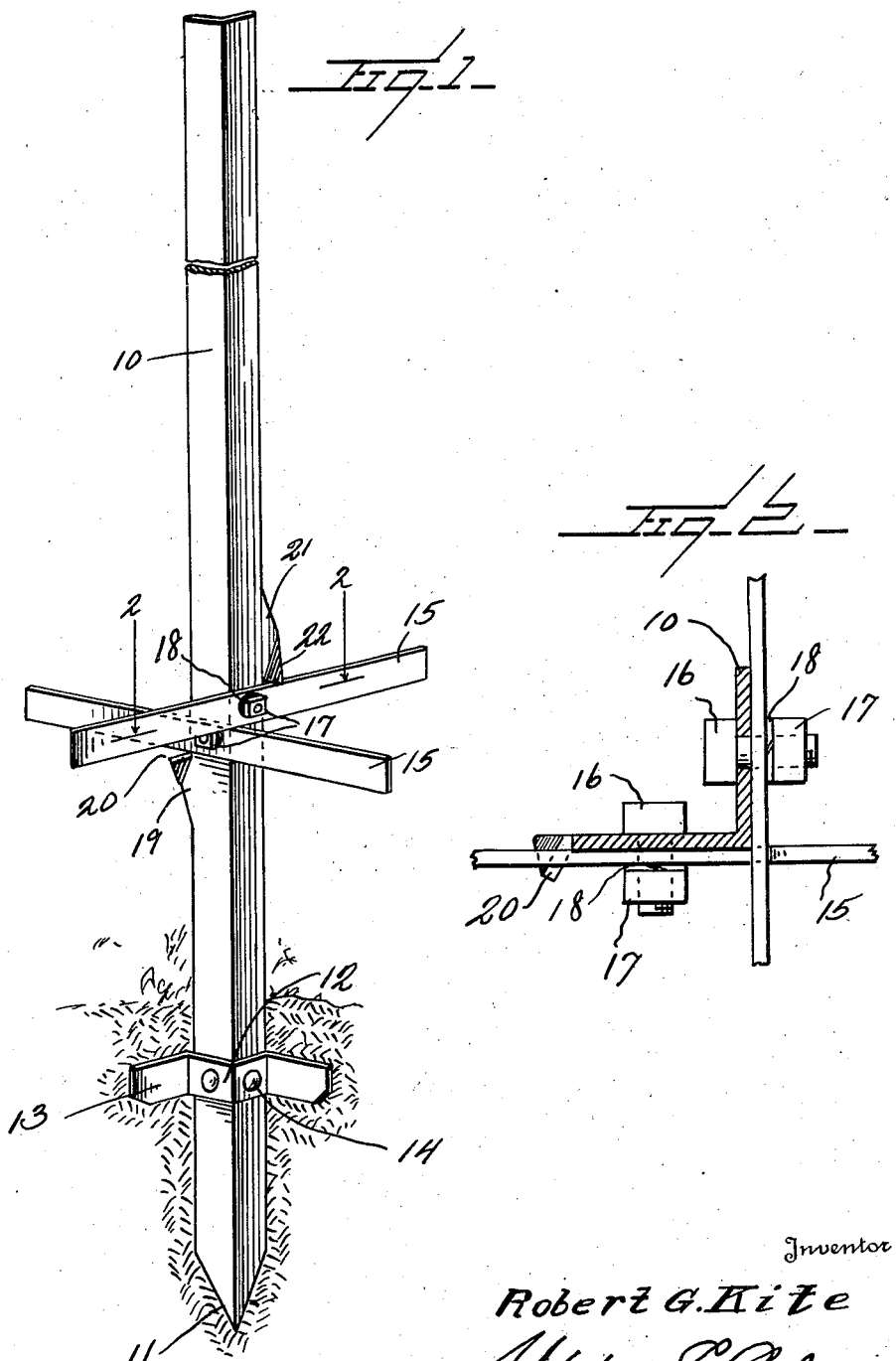
Inventor
Robert G. Kite
By Watson E. Coleman
Attorney Patented Dec. 8, 1942

2,304,695

UNITED STATES PATENT OFFICE 2,304,695

PEANUT VINE STACKING STAKE

Robert G. Kite, Omaha, Ga.

Application September 27, 1941, Serial No. 412,650

4 Claims. (Cl. 130—20)

This invention relates to improvements in stakes for use in agricultural pursuits and pertains particularly to an improved form or construction of stake for use in stacking peanut vines.

At the present time use is made, in connection with the raising of peanuts, of wooden stakes about which the vines are stacked or piled after the crop has been harvested. With such stakes the vines pack fairly closely together at the center of the stakes and in close contact with the stake and therefore little or no ventilation is provided for the center of the stack or pile with the result that if the pile gets wet, or as a result of its natural dampness from the vines, the center of the pile is apt to become moldy.

The primary object of the present invention is to provide an improved peanut stack pole or stake which is so constructed that when the vines have been stacked thereabout a space will be left to provide for the circulation of air through the center of the stack so as to prevent the matter from becoming molded.

Another object of the invention is to provide a pole or a stake having foldable cross-arms which when folded into parallel relation with the pole make it possible to stack the pole with others and when unfolded or opened out into a perpendicular relation with the pole provides strong arms for holding the peanut vines in a stack a substantial distance above the ground.

Another object of the invention is to provide a pole or stake of the character stated having ground anchor integral therewith, by means of which the stake will be firmly held in upright position after it has been driven the desired distance into the ground.

The invention will be best understood from consideration of the following detailed description taken in connection with the accompanying drawing, it being understood, however, that the invention is not to be considered as limited by the specific illustration or description but that such illustration and description constitute a preferred embodiment of the invention.

In the drawing:

Fig. 1 is a view in perspective of the improved stake or pole embodying the present invention.

Fig. 2 is a transverse section taken substantially on the line 2—2 of Fig. 1.

Referring now more particularly to the drawing the numeral 10 generally designates the stake or pole of the present invention. This is formed of angle iron material and at one end is pointed as indicated at 11 to facilitate its penetration into the ground.

A substantial distance above the point there is secured to the stake, preferably by the use of rivets, the transversely extending strap 12 which projects a substantial distance beyond the sides of the stake as shown. This strap is preferably applied to the outer side of the stake and the portions projecting beyond the two edges of the stake are then bent to extend substantially perpendicularly from the outer side faces to form the wings or anchors 13. The rivets by which the strap 12 is secured to the body of the stake, are indicated by numeral 14.

While I do not wish to be limited in any respect to dimensions for the stake or pole, it is preferred that the pole be make of eighth inch material having a width of about four inches and a length of approximately seven feet. The anchor strap 12 is preferably located about twelve inches from the point and is approximately two inches wide and ten inches long.

At a substantial distance above the anchor strap 12 there is disposed against each outer side portion of the pole, a rack arm 15 which is preferably about one-eighth inch thickness, about one and one-half inches wide and about twenty inches long. These arms, as shown, are disposed one above the other and are secured to the pole by bolts 16 which are passed through suitable holes, from the inner sides of the portions against which the arms are located, through holes in the arms, and receive upon their outer ends the nuts 17 between which and the adjacent arm a lock washer 18 is interposed.

It is preferred that the hole for the bolt 16 of the first or lowermost arms be about sixteen inches from its center to the anchor and the hole for the next bolt should be about seventeen and one-half inches from its center to the anchor.

The edge of the flange of the stake against which the lower most rack arm 15 is pivotally secured has the integral forwardly extending portion 19 which at its upper end is bent out to extend away from and perpendicular to the plane of the adjacent flange of the stake to form the shoulder 20.

Above the other arm 15 a similar forward extension 21 is formed integral with edge of the adjacent flange of the pole and this has at its lower outer end or corner the angled portion 22 which extends away from the plane of the adjacent flange to form a shoulder against which the top edge of the upper arm 15 abuts when the arm is supporting a mass of vines.

The lower shoulder is preferably approximately three-fourths of an inch below the adjacent or lower arm 15 and the upper shoulder is the same distance above the upper arm. These shoulders, as shown, are sufficiently spaced away from the centers of the adjacent arm supporting bolts, to permit the arms to be oscillated into positions parallel with the adjacent sides or flanges of the stake. Thus the stakes may be conveniently stacked and also the arms can be swung into vertical positions so as to permit plowing close to the pole.

By the use of the present stake or pole considerable time and labor will be saved the users because this can be set into the ground much more quickly than the present wooden poles and when once set cannot become dislodged or out of position. The present type of pole can be simply driven into the ground whereas with the wooden pole it is necessary to first dig a hole, set the pole and then fill up the hole and tamp the earth tightly thereabout.

As previously stated the present pole also allows for the ventilation of the vines stacked thereabout whereas this is not possible with wooden poles.

What is claimed is:

1. An agricultural stake comprising a relatively long bar having two edge joined angularly related flat portions, the bar being straight throughout its length and pointed at one end for penetration into the ground, an anchor element secured to the bar adjacent to said pointed end, a pair of arms each pivotally secured to and extending across one of the said two angularly related flat portions of the stake to be swung into a position at right angles to the body of the stake or parallel with the stake, one of the arms being disposed immediately adjacent to and above the other, and means carried by the stake forming stops for the arms to facilitate maintenance of the same in position transversely of the stakes.

2. An agricultural stake of the character described comprising a relatively long bar of V cross-section, a pair of arms each pivotally secured to the outer side of one of the two portions of the V, the pivot for one arm being above the pivot for the other arm, said arms when moved to position at right angles to the stake being in cross contacting relation, and means forming an integral part of the free edge of each portion of the stake and constituting a stop against which the adjacent arm abuts when in the said perpendicular relation to the stake.

3. In a stake of the character set forth in claim 2, an anchor comprising an elongated strip of material extending transversely of and secured to the stake below said arms, said strip of material having a substantial portion of each end extending perpendicularly to and away from the adjacent portion of the stake, and said stake being pointed at the end adjacent to said strip, said strip constituting a ground anchor.

4. An agricultural stake of the character described comprising a relatively long bar having two angularly related faces, a pair of arms each pivotally secured to the side of one of the two faces, the pivot for one arm being above the pivot for the other arm, said arms when moved to a position at right angles to the stake being in crossed contacting relation, and means forming an integral part of an edge of each face of the stake and constituting a stop against which the adjacent arm abuts when in the said perpendicular relation to the stake.

ROBERT G. KITE.